United States Patent [19]

Ishikawa

[11] Patent Number: 5,638,510

[45] Date of Patent: Jun. 10, 1997

[54] MULTIPLEXED SYSTEM WITH WATCH DOG TIMERS

[75] Inventor: Masahiro Ishikawa, Yokosuka, Japan

[73] Assignee: Nissan Motor Co., Ltd., Yokohama, Japan

[21] Appl. No.: 138,187

[22] Filed: Oct. 20, 1993

[30] Foreign Application Priority Data

Nov. 11, 1992 [JP] Japan .................................. 4-300846

[51] Int. Cl.⁶ .................................................. G06F 11/34
[52] U.S. Cl. ........................... 395/185.04; 395/185.08
[58] Field of Search ........................ 395/575, 185.08, 395/185.04; 371/16.3, 16.1, 15.1, 61, 62, 67.1; 364/569

[56] References Cited

U.S. PATENT DOCUMENTS

| | | | |
|---|---|---|---|
| 3,681,578 | 8/1972 | Stevens | 235/153 |
| 4,597,052 | 6/1986 | Matsuda | 364/550 |
| 4,783,778 | 11/1988 | Finch et al. | 370/60 |
| 5,241,550 | 8/1993 | Kusano | 371/71 |
| 5,271,023 | 12/1993 | Norman | 371/68.3 |

FOREIGN PATENT DOCUMENTS 1-298446  12/1989  Japan .

OTHER PUBLICATIONS

Microcomputer Technical Q & A, Hitach Microcomputer HMCS 400 Series Application Note, 2nd edition, No. ADJ-502-024A, p. 18, (Mar. 1990) QA 4HC-054A (No translation).

Akita et al., "Fail Safe System for Railway Signalling Control", *Denshi Jouhou Tsuushin Gakai Shi*, vol. 73, No. 11, pp. 1203-1208, (Nov. 1990) (No translation).

*Primary Examiner*—Robert W. Beausoliel, Jr.
*Assistant Examiner*—Phung My Chung
*Attorney, Agent, or Firm*—Foley & Lardner

[57] ABSTRACT

A multiplexed system including at least two microcomputers operable in parallel with each other, and watch dog timers. One of the watch dog timers is connected for receipt of an input signal from one of the microcomputers to check a program run-away condition in the one microcomputer. The other watch dog timer is connected for receipt of an input signal from the other microcomputer to check a program run-away condition in the other microcomputer. The one microcomputer checks the other watch dog timer, and the other microcomputer checks the one watch dog time. Calculation results are fed from the respective microcomputers to a comparator circuit which produces an output signal from the multiplexed system. When the one microcomputer checks the other watch dog timer, the input signal from the other microcomputer to the other watch dog timer is interrupted. The other watch dog timer is checked based on an operating condition of the other microcomputer. The calculation result fed from the other microcomputer to the comparator circuit is interrupted while the other watch dog timer is checked.

4 Claims, 2 Drawing Sheets

MULTIPLEXED SYSTEM WITH WATCH DOG TIMERS

BACKGROUND OF THE INVENTION

This invention relates to a multiplexed system including a plurality of microcomputers associated with watch dog timers for checking run-away in the respective microcomputers.

Multiplexed systems, which have a plurality of microcomputers multiplexed therein, include watch dog timers associated with the respective microcomputer to reset a defective microcomputer so as to stop the program run-away made in the defective microcomputer. For example, Japanese Patent Kokai No. 1-298446 discloses a prior art multiplexed system including two watch dog timers for checking program run-away in first and second microcomputers by monitoring watch dog pulse signals applied thereto from the respective microcomputers. When program run-away occurs in one of the first and second microcomputers, the corresponding watch dog timer produces a reset signal through a reset line to the one microcomputer. The prior art multiplexed system is arranged for the first and second microcomputers to check the watch dog timers at uniform intervals of time. The first microcomputer checks the second watch dog timer by monitoring the reset line of the second microcomputer while interrupting the watch dog pulse signal to the second watch dog timer. The second microcomputer checks the first watch dog timer by monitoring the reset line of the first microcomputer while interrupting the watch dog pulse signal to the first watch dog timer. Although the prior art multiplexed system is sufficient for checking the operations of the watch dog timers, it cannot check whether a watch dog timer has initialized the corresponding microcomputer correctly.

SUMMARY OF THE INVENTION

It is a main object of the invention to provide a multiplexed system which can monitor the operations of a plurality of microcomputers to check associated watch dog timers.

There is provided, in accordance with the invention, a multiplexed system which comprises at least two microcomputers operable in parallel with each other, and watch dog timers. One of the watch dog timers is connected for receipt of an input signal from one of the microcomputers to check a program run-away condition in the one microcomputer. The other watch dog timer is connected for receipt of an input signal from the other microcomputer to check a program run-away condition in the other microcomputer. The one microcomputer checks the other watch dog timer. The other microcomputer checks the one watch dog timer. The multiplexed system also includes means for comparing calculation results fed thereto from the respective microcomputers to produce an output signal from the multiplexed system, means for interrupting the input signal from the other microcomputer to the other watch dog timer when the one microcomputer checks the other watch dog timer, means for checking the other watch dog timer based on an operating condition of the other microcomputer, and means for interrupting the calculation result fed from the other microcomputer to the comparing means while the other watch dog timer is checked.

BRIEF DESCRIPTION OF THE DRAWINGS

The invention will be described in greater detail by reference to the following description taken in connection with the accompanying drawings, in which.

DETAILED DESCRIPTION OF THE INVENTION

Figure 1:
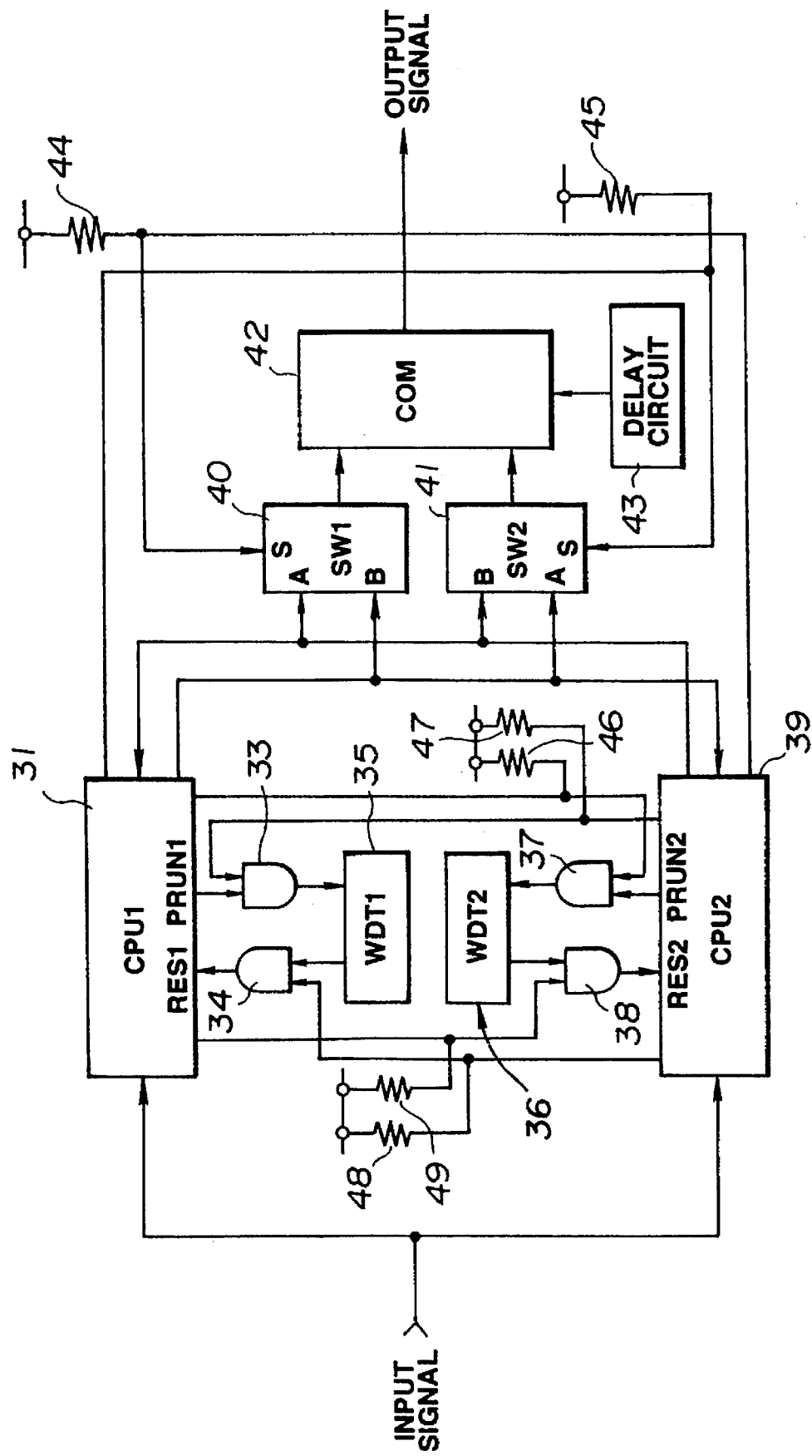
FIG. 1 is a schematic block diagram showing one embodiment of a multiplexed system made in accordance with the invention.

With reference to the drawings and in particular to FIG. 1, there is shown one embodiment of a schematic block diagram of a multiplexed system embodying the invention. The multiplexed system includes first and second microcomputers 31 and 39 which make the same calculations according to the state of an input signal applied thereto, and a first and second watch-dog timers 35 and 36 provided for the respective microcomputers 31 and 39. The second microcomputer (CPU2) 39 controls a gate circuit 33 through which a program run signal PRUN1 is fed to the first watch-dog timer (WDT1) 35 from the first microcomputer (CPU1) 31. When the program run signal PRUN1 is abnormal, the first watch-dog timer 35 produces a reset signal to the reset terminal of the first microcomputer 31 through a gate circuit 34 which is controlled by the second microcomputer 39. The first microcomputer 31 controls a gate circuit 37 through which a program run signal PRUN2 is fed to the second watch-dog timer (WDT2) 36 from the second microcomputer 39. When the program run signal PRUN2 is abnormal, the second watch-dog timer 39 produces a reset signal to the reset terminal of the second microcomputer 39 through a gate circuit 38 which is controlled by the first microcomputer 31. The multiplexed system also includes first and second switching circuits 40 and 41. The first switching circuit (SW1) 40 is normally in a first state passing an output signal from the first microcomputer 31 to a comparator circuit 42. The first switching circuit 40 changes into a second state passing an output signal from the second microcomputer 39 to the comparator circuit 42 in response to a command from the second microcomputer 39. The second switching circuit (SW2) 41 is normally in a first state passing an output signal from the second microcomputer 39 to the comparator circuit 42. The second switching circuit 41 changes to a second state passing an output signal from the first microcomputer 31 to the comparator circuit 42 in response to a command from the first microcomputer 31. The comparator circuit 42 compares the outputs fed thereto from the first and second switching circuits 40 and 41. A delay circuit 43 is connected to the comparator circuit 42 for providing a delay to the result of the comparison made in the comparator circuit 42. In FIG. 1, the numerals 44, 45, 46, 47, 48 and 49 indicate pull-up resistors.

Figure 2:
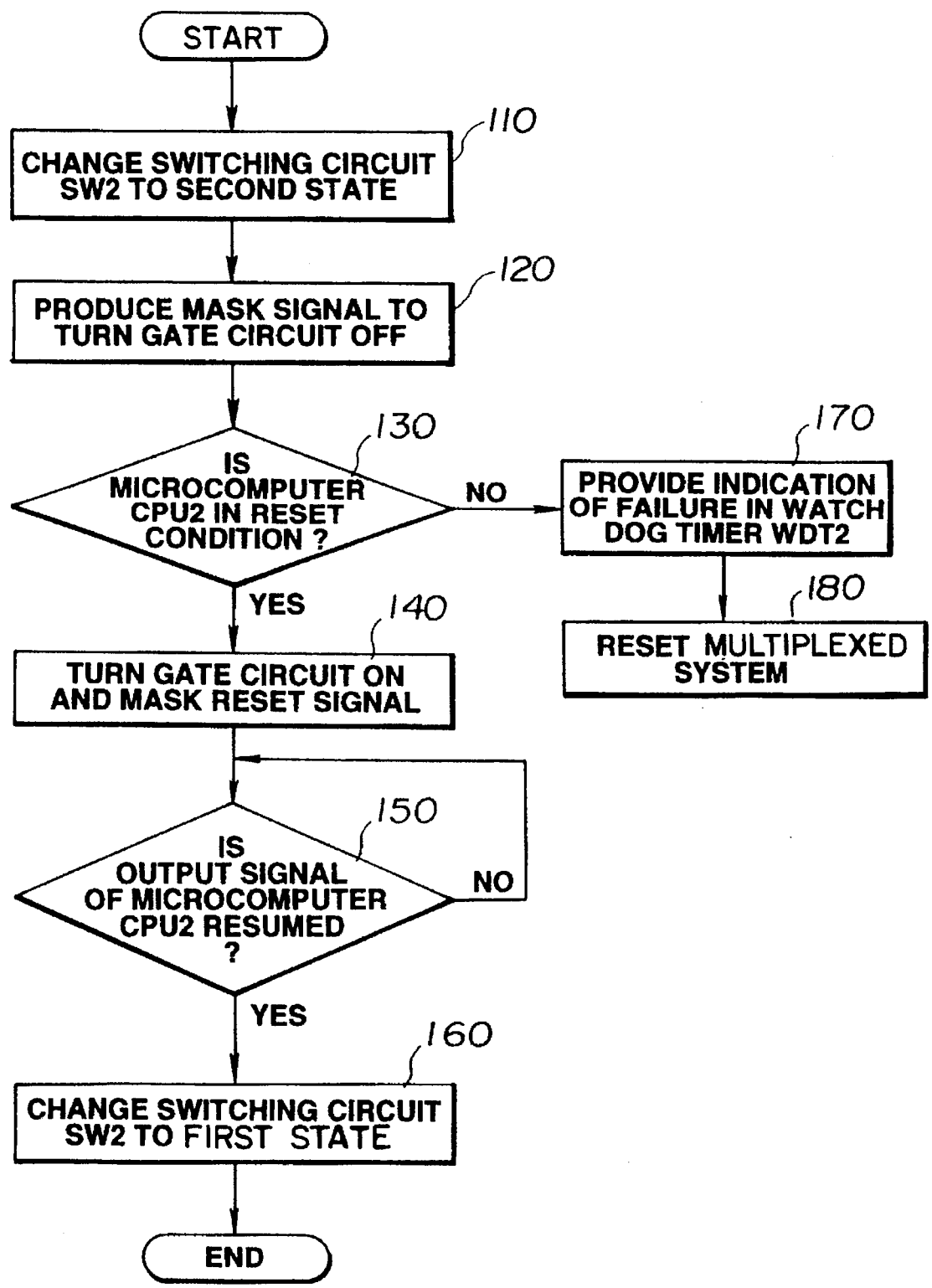
FIG. 2 is a flow diagram used in explaining the operation of the multiplexed system of FIG. 1.

FIG. 2 is a flow diagram illustrating the operation of the first microcomputer 31 to check the second watch-dog timer 36. At the point 110, the first microcomputer 31 produces a command to change the second switching circuit 41 to the second state passing the output signal fed thereto from the first microcomputer 31 to interrupt the operation of the comparator circuit 42. At the point 120, the first microcomputer 31 produces a mask signal to turn the gate circuit 3 7 off so as to mask the program run signal (PRUN2) from the second microcomputer 39 and operates the second watch-dog timer 36. At the point 130, the first microcomputer 31 makes a determination as to whether or not the second watch-dog timer 36 is operating in order. This determination is made based on the state of the output signal from the second microcomputer 39. The second watch-dog timer 36 is operating in order when the output signal from the second microcomputer 39 is in a reset state. In this case, at the point 140, the first microcomputer 31 produces a command to turn the gate circuit 37 on and at the same time produces a command to produce a mask signal to gate circuit 38 so as to mask the reset signal from the second watch-dog timer 36 to the second microcomputer 39. As a result, the operation of the second microcomputer 39 is resumed. At the point 150, the first microcomputer 31 makes a determination as to whether or not the output signal of the second microcomputer 39 is resumed. If the output signal of the second microcomputer 39 is resumed, at the point 160, the first microcomputer 31 produces a command to change second the first switching circuit 41 to the first state passing the output signal from the second microcomputer 39 and interrupts the mask signal to the gate circuit 38. If the output signal from the second microcomputer 39 is not in the reset state, at the point 170, an indication is made that the second watch-dog timer 36 is subject to a failure. In this case, at the point 180, the first microcomputer 31 produces a command to reset the multiplexed system.

While the operation of the first microcomputer 31 to check the watch-dog timer 36 has been described, it is to be understood that the second microcomputer 39 operates in a similar manner to check the watch-dog timer 35.

What is claimed is:

1. A multiplexed system, comprising:

first and second microcomputers;

first and second watch-dog timers connected to the first and second microcomputers, respectively;

first, second, third, and fourth gate circuits;

said second microcomputer controlling said first gate circuit, a first program run signal being fed to the first gate circuit and the first watch-dog timer from the first microcomputer, wherein when the first program run signal is in an abnormal state, the first watch-dog timer supplies a first reset signal to a reset terminal of the first microcomputer through said second gate circuit which is controlled by the second microcomputer, said first microcomputer controlling said third gate circuit, a second program run signal being fed to the third gate circuit and the second watch-dog timer from the second microcomputer, wherein when the second program run signal is in the abnormal state, the second watch-dog timer supplies a second reset signal to a reset terminal of the second microcomputer through said fourth gate circuit which is controlled by the first microcomputer;

first and second switching circuits; and a comparator circuit connected to said first and second switching circuits, said first switching circuit normally being in a first state to pass an output signal from the first microcomputer to said comparator circuit, said first switching circuit changing into a second state to pass an output signal from the second microcomputer to the comparator circuit in response to a first command from the second microcomputer, said second switching circuit normally being in the first state to pass the output signal from the second microcomputer to the comparator circuit, said second switching circuit changing to the second state to pass said output signal from the first microcomputer to the comparator circuit in response to a second command from the first microcomputer, the second command interrupting the operation of the comparator circuit, and said comparator circuit comparing the output signals fed thereto from the first and second switching circuits to generate a comparator output signal.

2. A multiplexed system, as recited in claim 1, further comprising a delay circuit connected to the comparator circuit for providing a delay to a result of the comparison made in the comparator circuit.

3. A multiplexed system, as recited in claim 1, wherein the first microcomputer produces a first mask signal to turn the third gate circuit "off" and mask the second program run signal from the second microcomputer, and the first microcomputer determines whether the second watch-dog timer is operating in a normal state based on the output signal provided from the second microcomputer, the second watch-dog timer operating normally when the output signal from the second microcomputer is in a reset state in which the first microcomputer turns the third gate circuit "on" and provides a second mask signal to the fourth gate circuit for masking the second reset signal provided from the second watch-dog timer to the second microcomputer, thereby resuming operation of the second microcomputer, and the first microcomputer determines whether the output signal of the second microcomputer has resumed, and produces the second command to change the second switching circuit to the first state to pass the output signal from the second microcomputer and interrupts the second mask signal provided to the fourth gate circuit, and when the output signal from the second microcomputer is not in the reset state indicating that the second watchdog timer has failed, the first microcomputer resets the multiplexed system.

4. A multiplexed system, as recited in claim 1, wherein the second microcomputer produces a third mask signal to turn the first gate circuit "off" and mask the first program run signal from the first microcomputer, and the second microcomputer determines whether the first watch-dog timer is operating in a normal state based on the output signal provided from the first microcomputer, the first watch-dog timer operating normally when the output signal from the first microcomputer is in a reset state in which the second microcomputer turns the first gate circuit "on" and provides a fourth mask signal to the second gate circuit for masking the first reset signal provided from the first watch-dog timer to the first microcomputer, thereby resuming operation of the first microcomputer, and the second microcomputer determines whether the output signal of the first microcomputer has resumed, and produces the first command to change the first switching circuit to the first state to pass the output signal from the first microcomputer and interrupts the fourth mask signal provided to the second gate circuit, and when the output signal from the first microcomputer is not in the reset state indicating that the first watchdog timer has failed, the second microcomputer resets the multiplexed system.

* * * * *